(12) United States Patent
Van Beveren et al.

(10) Patent No.: US 12,025,094 B2
(45) Date of Patent: Jul. 2, 2024

(54) DEVICE SUBJECTING A WIND TURBINE BLADE TO FORCE AND A SYSTEM FOR FATIGUE TESTING OF THE BLADE

(71) Applicant: LM WIND POWER A/S, Kolding (DK)

(72) Inventors: Cornelis Van Beveren, Heerhugowaard (NL); Morten Philipsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 107 days.

(21) Appl. No.: 17/912,944

(22) PCT Filed: Apr. 29, 2021

(86) PCT No.: PCT/EP2021/061236
§ 371 (c)(1),
(2) Date: Sep. 20, 2022

(87) PCT Pub. No.: WO2021/219774
PCT Pub. Date: Nov. 4, 2021

(65) Prior Publication Data
US 2023/0055216 A1 Feb. 23, 2023

(30) Foreign Application Priority Data
Apr. 29, 2020 (GB) ..................... 2006288

(51) Int. Cl.
*F03D 17/00* (2016.01)
*G01M 5/00* (2006.01)
(52) U.S. Cl.
CPC ........... *F03D 17/00* (2016.05); *G01M 5/0016* (2013.01)
(58) Field of Classification Search
None
See application file for complete search history.

(56) References Cited

U.S. PATENT DOCUMENTS

| 2006/0037402 A1 | 2/2006 | Musial et al. |
| 2016/0018284 A1 | 1/2016 | Lee et al. |
| 2021/0108619 A1* | 4/2021 | Christiansen ........... G01M 7/06 |

FOREIGN PATENT DOCUMENTS

| CN | 201464169 U | 5/2010 |
| CN | 103245576 A | 8/2013 |

(Continued)

OTHER PUBLICATIONS

Post, Nathan, et al. "Fatigue Test Design: Scenarios for Biaxial Fatigue Testing of a 60-Meter Wind Turbine Blade"; National Renewable Energy Laboratory; Aug. 2019.

*Primary Examiner* — Lisa M Caputo
*Assistant Examiner* — Cynthia L Davis
(74) *Attorney, Agent, or Firm* — Nath, Goldberg & Meyer; Jerald L. Meyer; Tanya E. Harkins

(57) ABSTRACT

A device for subjecting a cantilevered wind turbine blade to transverse force during a fatigue test of the wind turbine blade, the device comprising:
a pivot arm having a longitudinal pivot arm axis and being pivotally supported in an arm supporting structure for pivoting about an essentially horizontal pivot axis,
a mass member being connected to the pivot arm, and
a coupling member providing a connection between the pivot arm and a blade fixture configured to be fixedly connected to the blade,
the pivot axis, the mass member and the coupling member being mutually spaced along the longitudinal pivot arm axis. The system comprises the device and an exciter configured for cyclically subjecting the cantilevered blade to a transverse reciprocating movement.

18 Claims, 6 Drawing Sheets

(56) References Cited

FOREIGN PATENT DOCUMENTS

| | | | |
|---|---|---|---|
| CN | 103512732 | A | 1/2014 |
| CN | 107110736 | A | 8/2017 |
| EP | 2848910 | A1 | 3/2015 |
| EP | 3198255 | B1 | 1/2019 |
| WO | 2009135136 | A2 | 11/2009 |
| WO | 2011091081 | A1 | 7/2011 |
| WO | 2013143638 | A1 | 10/2013 |
| WO | 2016045684 | A1 | 3/2016 |

* cited by examiner

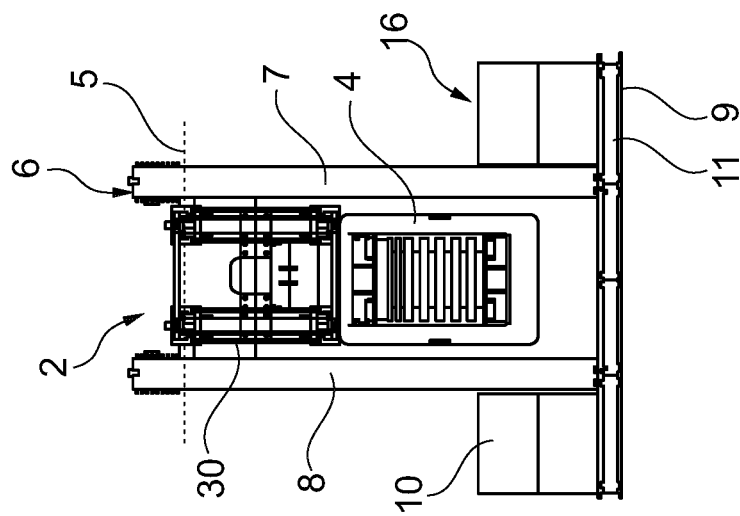
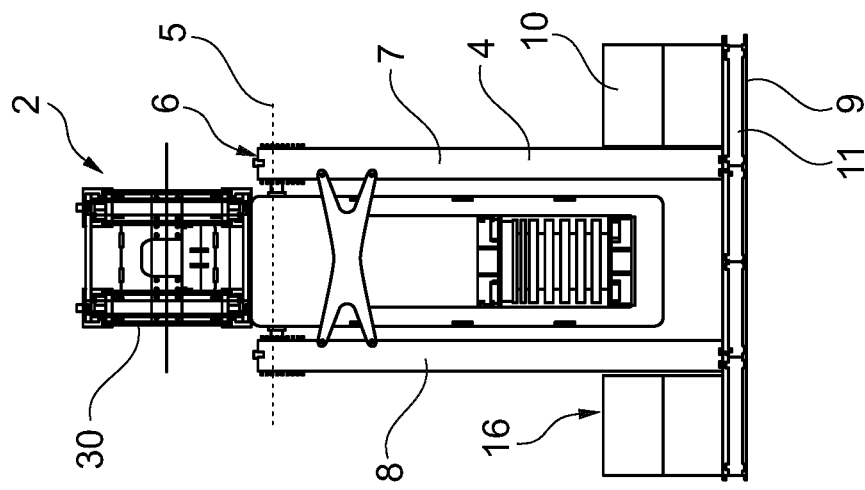
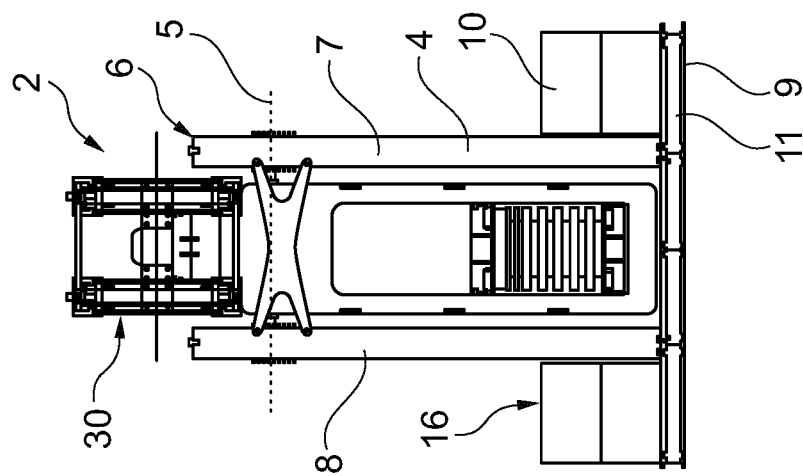

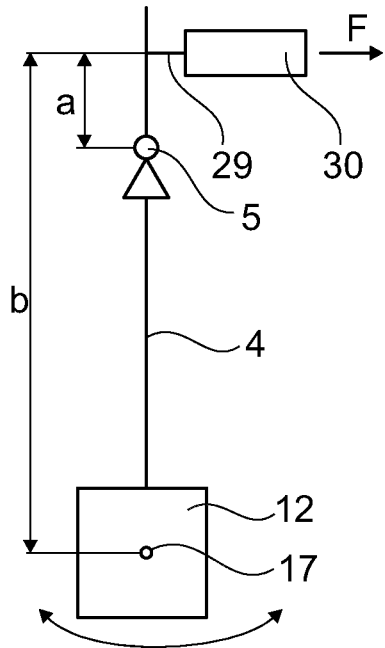
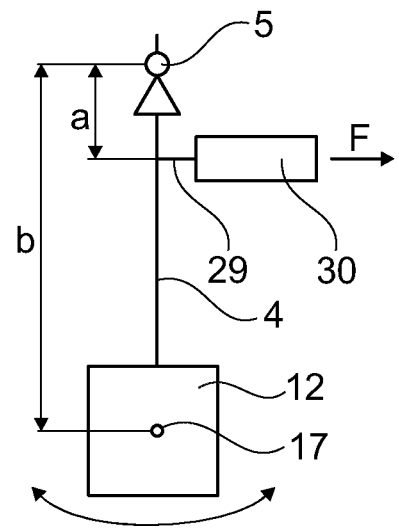
Fig. 6a    Fig. 6b
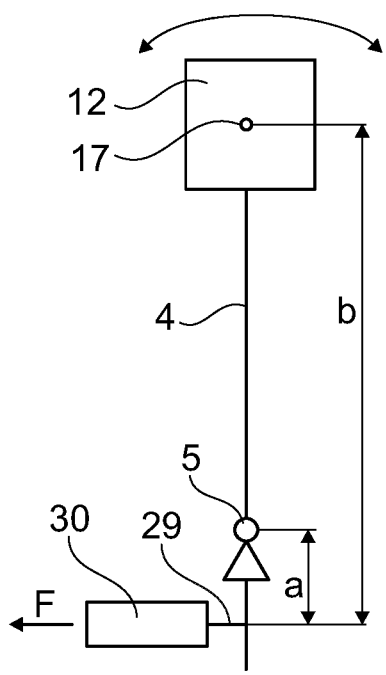
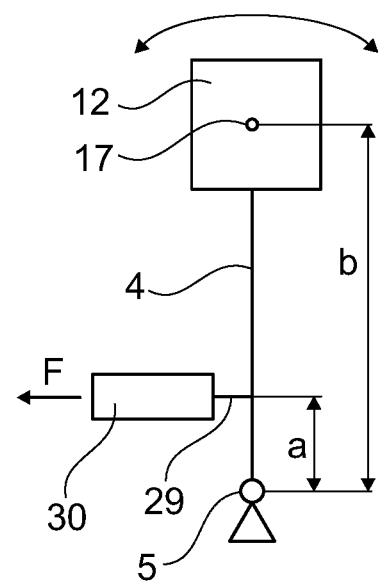
Fig. 6c    Fig. 6d

DEVICE SUBJECTING A WIND TURBINE BLADE TO FORCE AND A SYSTEM FOR FATIGUE TESTING OF THE BLADE

This is a National Phase Application filed under 35 U.S.C. 371 as a national stage of PCT/EP2021/061236, filed Apr. 29, 2021, an application claiming the benefit of Great Britain Application No. 2006288.1, Apr. 29, 2020, the content of each of which is hereby incorporated by reference in its entirety.

FIELD OF THE INVENTION

The present invention relates to a device for applying an essentially horizontal transverse edgewise force to an essentially horizontal cantilevered wind turbine blade subjected to essentially horizontal edgewise reciprocal movement or vibration during fatigue testing of the wind turbine blade, and a system for fatigue testing a wind turbine blade and a method of fatigue testing of a wind turbine blade for transverse edgewise reciprocating movements or vibrations.

BACKGROUND OF THE INVENTION

Fatigue testing of wind turbine blades is typically carried out by loading a cantilevered blade by means of one or more weights arranged on different places of the blade as seen in the longitudinal direction of the blade and an exciter subjecting the blade to a transverse oscillating movement at, or approximately at the resonance frequency, i.e. the eigen frequency or natural frequency of the blade including any load thereon, such as weights or the exciter. Using one or more weights will preload the blade in a manner that probably does not correspond to the loading of the blade during normal operation. Additionally, the handling of the weights and arranging them on the blade is a troublesome and heavy task.

The object of the present invention is to eliminate or reduce the disadvantages of known devices and systems and methods for fatigue testing of wind turbine blades.

SUMMARY OF THE INVENTION

The above object is obtained by a pendulum for applying an essentially horizontal transverse edgewise force to an essentially horizontal cantilevered wind turbine blade subjected to essentially horizontal edgewise reciprocal movement or vibration during a fatigue test of the wind turbine blade, the wind turbine blade comprising a root end and a tip end and a longitudinal blade axis, the pendulum device comprising
- a rigid pendulum pivot arm having a longitudinal pendulum pivot arm axis and being pivotally supported in an arm-supporting structure for pivoting in an essentially vertical plane about an essentially horizontal pendulum pivot axis,
- a mass member being connected to the pendulum pivot arm, and
- a coupling member providing a connection between the pendulum pivot arm and a blade fixture configured to be fixedly connected to the blade, the pendulum pivot axis, the mass member and the coupling member being mutually spaced along the longitudinal pendulum pivot arm axis.

The device is basically a pendulum comprising a blade fixture configured to be fixedly connected to a section of the blade and is therefore also named a pendulum device.

The pendulum pivot arm of the pendulum device has a substantially upright or vertical equilibrium position, the equilibrium position being a stable position when the pendulum is an ordinary pendulum where the mass member is arranged below the pendulum pivot axis and the equilibrium position is unstable when the mass member is arranged above the pendulum pivot axis The force F that the device or pendulum device is able to produce when the blade fixture is fixedly connected to the blade and the blade is subjected to transversal reciprocating movement caused by an exciter depends, inter alia, of the weight of the mass member and the ratio between the spacing b between the pivot axis and the centre of gravity of the mass member and the spacing a between the pivot axis and the coupling member connected to the blade fixture, the effect of the inertial force of the mass element being multiplied by said ratio between b and a.

The high inertia of the pendulum device is for a force of resistance to move the pendulum device, the pendulum device being a passive device following the reciprocating movement of the blade caused by an exciter.

Additionally, the mass required to produce the desired lateral force is considerably smaller than for known devices and systems for fatigue testing of wind turbine blades, and therefore the testing frequency can be higher and the testing time shorter than for current testing devices and systems, the testing frequency being preferably the resonance frequency or close to the resonance frequency of the blade including any loads thereon, such as an exciter and the pendulum device. Finally, the pendulum device does not produce any vertical force on the blade during testing.

According to an embodiment of the present invention, the pivot axis of the device is arranged between the mass member and the coupling member, and the coupling member is arranged above both the pivot axis and the mass member, as seen in the direction of the longitudinal pivot arm axis.

Thereby the pivot arm of the device can be considered the arm of a normal pendulum where the coupling member is arranged above the pivot axis, and the mass member or bob is arranged below the pivot axis. At present this embodiment is considered the preferred embodiment.

According to another embodiment of the present invention, the coupling member of the device is arranged between the mass member and the pivot axis, and the mass member is arranged below both the pivot axis and the coupling member, as seen in the direction of the longitudinal pivot arm axis.

Thereby the pivot arm of the pendulum device can be considered the arm of a normal pendulum where the coupling member is arranged between the pivot axis being arranged at the upper end of the arm and the mass member or bob being arranged at the lower end of the arm.

According to an additional embodiment, the pivot axis of the device is arranged between the mass member and the coupling member, and the coupling member is arranged below both the pivot axis and the mass member, as seen in the direction of the longitudinal pivot arm axis.

Thereby the pivot arm of the pendulum device can be considered the arm of an inverted pendulum where the coupling member is arranged below the pivot axis, and the mass member or bob is arranged above the pivot axis.

According to a further embodiment, the coupling member of the device is arranged between the mass member and the pivot axis, and the mass member is arranged above both the pivot axis and the coupling member, as seen in the direction of the longitudinal pivot arm axis.

Thereby the pivot arm of the pendulum device can be considered the arm of an inverted pendulum where the coupling member is arranged between the pivot axis being arranged at the lower end of the arm and the mass member or bob being arranged at the upper end of the arm.

According to an embodiment, the mass member comprises a number of weights being attachable and detachable relative to the pivot arm.

Thereby the desired force produced by the device can be adjusted by means of the number of weights attached to the pivot arm.

According to an embodiment, the mass member is connected adjustably to the pivot arm in the longitudinal direction of the pivot arm.

Thereby the desired force produced by the device can be adjusted and/or additionally adjusted by adjusting the position of mass member along the longitudinal pivot arm axis.

According to an embodiment, the coupling member and the blade fixture connected thereto are connected adjustably to the pivot arm in the longitudinal direction of the pivot arm.

Thereby the desired force produced by the device can be adjusted and/or additionally adjusted by adjusting the position of the mass member along the pivot arm axis. Additionally, the coupling member and the blade fixture connected thereto can be positioned in the correct level for fixedly connecting the blade fixture to the desired section of the blade and essentially in line with the chord line of the blade section when fatigue testing for edgewise forces is to be carried out by means of the device.

According to an embodiment, the pivot axis of the pivot arm is arranged height adjustably in the arm-supporting structure.

It is thereby possible to arrange the coupling member of the pivot arm of the device and the blade fixture connected thereto in the correct horizontal plane of the desired blade section for fixedly connecting the blade fixture to the blade and substantially in line with the chord line of the blade section when fatigue testing for edgewise forces is to be carried out by means of the device.

The coupling element of the device can be a coupling member compensating for misalignment between the connection point of the coupling member to the pivot arm and the blade fixture respectively. Thus, the misalignment-compensating coupling of the device can be a universal joint or a universal joint-like coupling member.

According to an embodiment of the present invention, the arm-supporting structure of the device is at the lower end thereof connected to a base plate.

According to an embodiment, the arm-supporting structure of the device comprises two mutually spaced upright legs arranged on opposite sides of the pivot arm being pivotal about the pivot axis extending between the two legs.

The legs of the arm-supporting structure can at the lower ends thereof be connected to the base plate.

According to an embodiment, the baseplate is configured to be loaded by a ballast such as a number of ballast weights being attachable and detachable relative to the base plate.

The base plate provides stability to the pendulum apparatus, and the stability is improved by the base plate being configured to be loaded by a ballast, such as a number of ballast weights being attachable and detachable relative to the base plate.

Additionally, the base plate can comprise a plurality of base plate modules being mutually attachable and detachable. Thereby it is possible to dismount the base plate and move the base plate and the rest of the device to another position and mount it at that position.

As an alternative to the base plate the lower ends of the arm-supporting structure, including the legs of the arm-supporting structure, can be cast into the ground and thereby be permanently placed on a given place. Alternatively, the lower ends of the legs of the arm-supporting structure of the pendulum device can be bolted to the ground at a given place thereof or at a number of preselected places.

An additional alternative is to arrange the pendulum device on a X-Y tablelike arrangement comprising a first supporting member arranged movably and lockably on a first set of parallel tracks anchored to the ground in parallel to the essentially horizontal longitudinal blade axis of a cantilevered wind turbine to be tested and fixedly supported in a blade support structure, and the arm-supporting structure of the pendulum device are arranged movably and lockably on a second set of parallel tracks relative to the first supporting member, the second set of parallel tracks being arranged essentially perpendicular to the first set of parallel tracks. Thereby the pendulum device can be moved to the desired longitudinal position relative to the wind turbine blade and additionally to the desired transverse position relative to the wind turbine blade, whereby the pendulum device can easily be arranged at the correct place for carrying out the fatigue test.

According to an embodiment of the present invention, the blade fixture is divided into two fixture parts having respective mutually facing abutment faces configured to define an inner contour corresponding essentially to the outer shape of the blade in a section thereof where the blade fixture is to be fixedly connected to the blade.

According to a further aspect, the present invention relates to a system for fatigue testing of a wind turbine blade comprising a root end and a tip end and a longitudinal blade axis, and comprising:
    a pendulum device according to the present invention,
    a support structure for fixedly supporting the blade in a cantilevered position at the root end thereof so that the longitudinal blade axis is essentially horizontal and so that an essentially horizontal transverse edgewise force can be applied to the blade by the pendulum device, and
    an oscillation exciter, also termed an oscillation actuator, configured for cyclically subjecting the blade to essentially horizontal transverse edgewise reciprocating movement or vibration relative to the support structure.

In an embodiment of the system configured for fatigue testing of the blade for transverse edgewise reciprocating movement, the oscillation exciter is configured to subject the blade to transverse edgewise reciprocating movements and the coupling member providing the connection between the pivot arm and the blade fixture and the blade fixture fixedly connected to the blade are arranged essentially in line with the local chord line of the desired blade section during the fatigue test where edgewise forces are applied to the blade by the pendulum device.

The edgewise exciter can be mounted on the blade. Alternatively, the edgewise exciter can be supported on the ground and configured so as to at least essentially not load the blade in other directions than edgewise.

According to an additional aspect, the present invention relates to a method of fatigue testing of a wind turbine blade for transverse edgewise reciprocating movements or vibrations, comprising the following steps:
    providing a wind turbine blade comprising a root end and a tip end and a longitudinal blade axis, fixedly supporting the root end of the blade in a support structure so that the blade is horizontal cantilevered and so that the local chords of the blade are essentially horizontal at the desired blade section where an essentially horizontal transverse edgewise force is to be applied to the blade, arranging a pendulum device according to the present invention relative to the cantilevered blade and fixedly connecting the blade fixture to the blade so that the pivot axis of the pendulum device is essentially parallel to the longitudinal axis of the blade and the coupling member providing the connection between the pivot arm and the blade fixture is essentially in line with the local chord of the desired blade section where the essentially horizontal transverse edgewise force is to be applied to the desired blade section by the pendulum device, providing an oscillation exciter and connecting the exciter to the blade so as to subject the blade to a desired region of the blade so as to subject the blade to essentially horizontal transverse edgewise reciprocating movement or vibrations at the desired region of the blade during the fatigue test.

BRIEF DESCRIPTION OF THE FIGURES

The invention is explained in detail below with reference to embodiments shown in the drawings, in which FIG. 5c is a diagrammatical front view of a second embodiment of the pendulum device according to the invention, FIG. 6a is a simplified diagrammatical view of the first embodiment of the pendulum apparatus shown in FIGS. 1 to 4 and FIGS. 5a and 5b, FIG. 6b is a simplified diagrammatical view of the second embodiment of the pendulum apparatus shown in FIG. 5b, FIG. 6c is a simplified diagrammatical view of a third embodiment of the apparatus where the pivot arm can be considered the arm of an inverted pendulum and the coupling member is arranged below the pivot axis and the mass member is arranged above the pivot axis, and FIG. 6d is a simplified diagrammatical view of a fourth embodiment of the apparatus where the pivot arm can be considered the arm of an inverted pendulum where the coupling member is arranged between the pivot axis being arranged at the lower end of the arm and the mass member being arranged at the upper end of the arm.

DETAILED DESCRIPTION OF THE INVENTION

Figure 1:
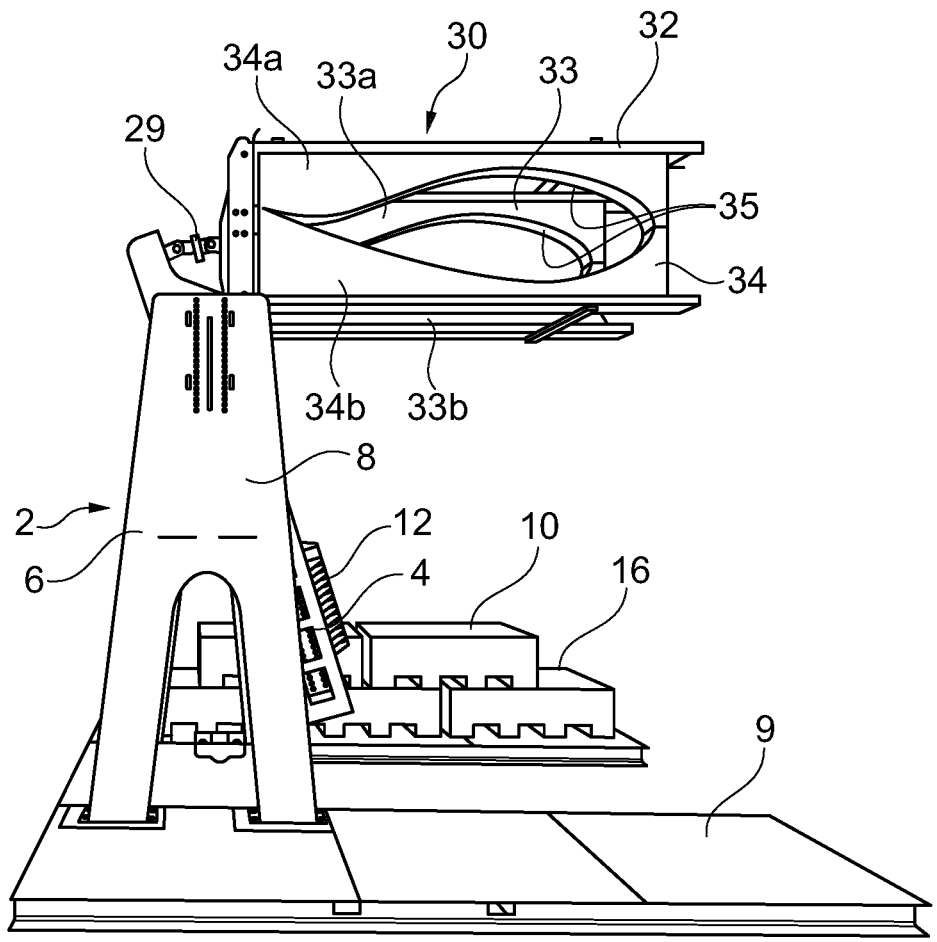
FIG. 1 is a diagrammatical perspective view of an at present preferred first embodiment of the pendulum device according to the invention.
Figure 2:
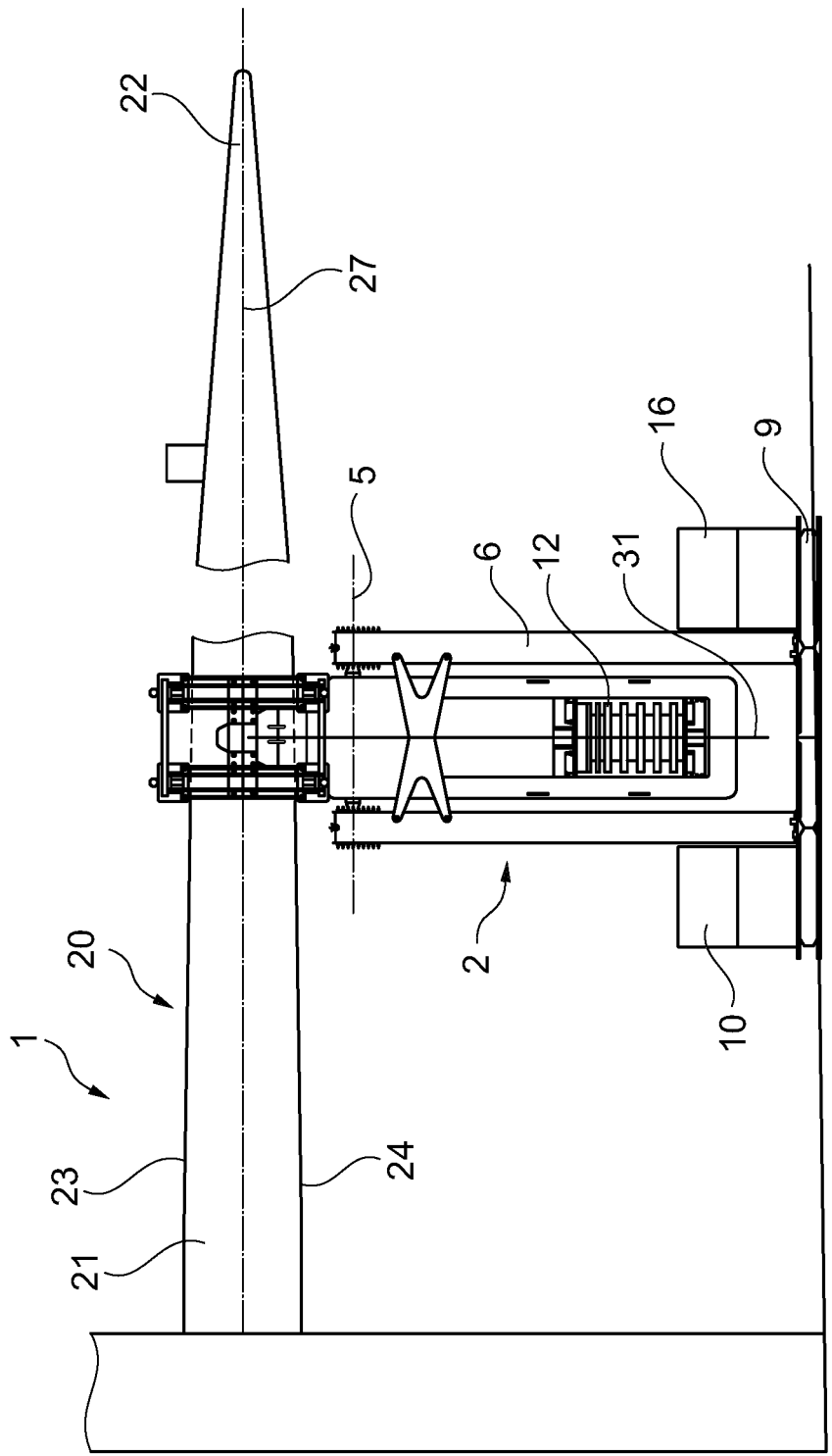
FIG. 2 is a diagrammatical lateral view of a system according to the invention comprising the device according to the invention shown in FIG. 1.
Figure 3:
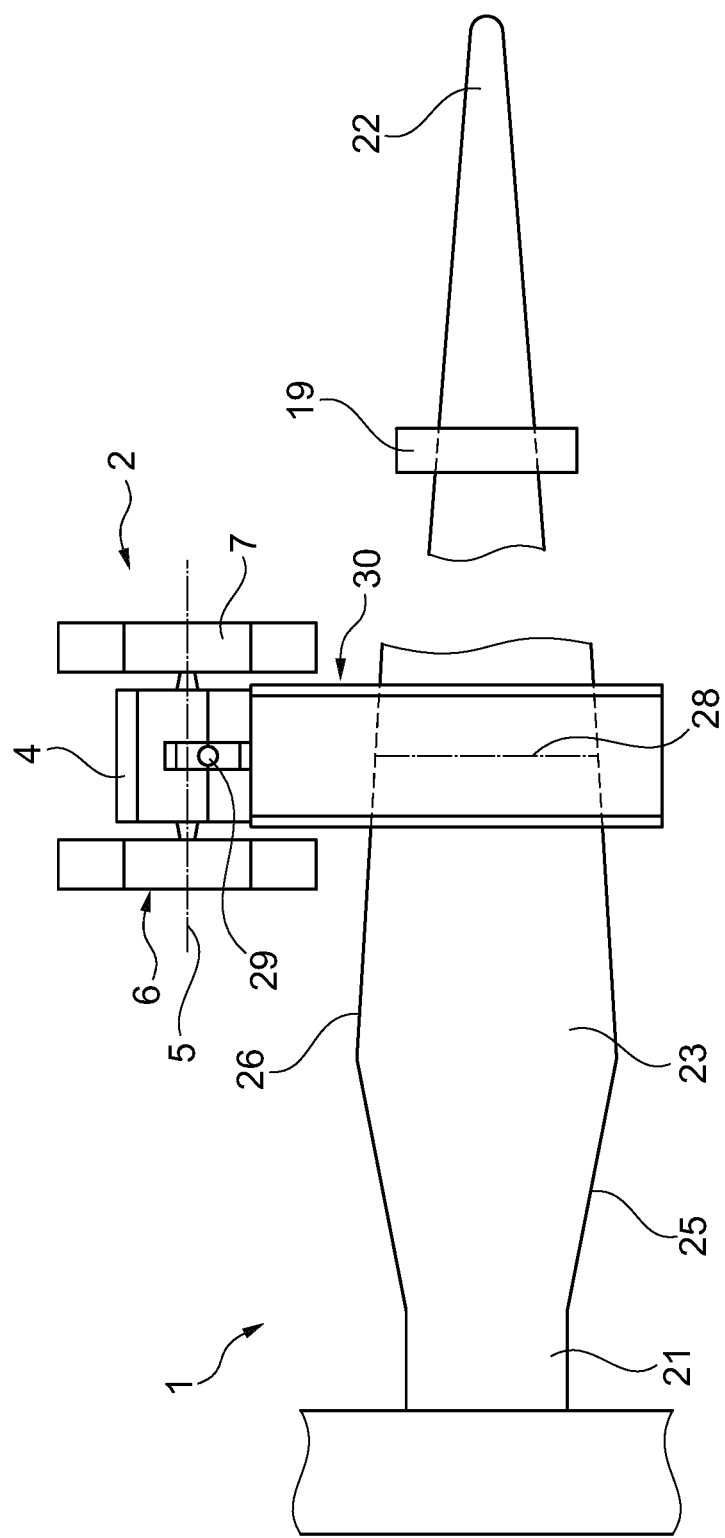
FIG. 3 is a top view of the system disclosed in FIG. 2.
Figure 4C:
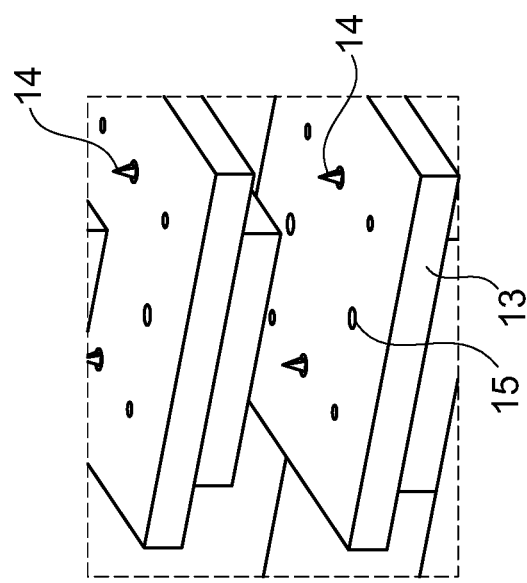
FIG. 4a is a diagrammatical perspective view of a pivot arm of the apparatus shown in FIGS. 1 to 3.
FIG. 4b is a diagrammatical perspective view of a stack of a mass member of the pivot arm shown in FIG. 4a, FIG. 4c is an enlarged diagrammatical perspective view of weights shown in FIG. 4b, FIGS. 5a and 5b are diagrammatical perspective front views of the pendulum device according to the invention, the pivot axis of the pivot arm being arranged in different heights.
Figure 4B:
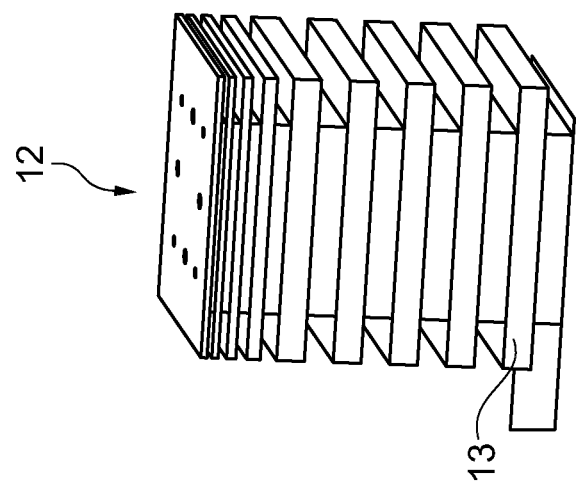
Figure 4A:
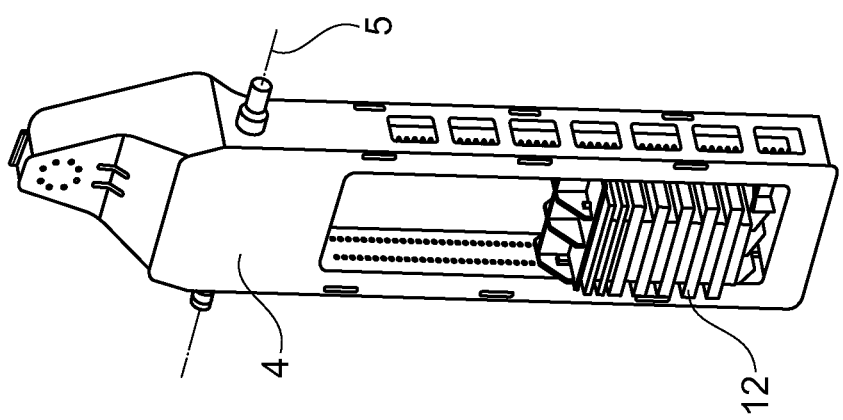

Reference is made to FIG. 1 to FIG. 5, FIG. 5a, FIG. 5b and FIG. 6a disclosing a first embodiment of the apparatus according to the first embodiment of the device 2 according to the invention, FIG. 2 and FIG. 3 disclosing a system 1 according to the invention and comprising the above first embodiment of the device 2 according to the invention.

The wind turbine blade 20 comprises a root end 21 and a tip end 22 and a longitudinal blade axis 27 extending from the root end 21 to the tip end 22. Additionally, the blade comprises a pressure side 23 and a suction side 24 and a leading edge 25 and a trailing edge 26 and chords 28 extending from the leading edge 25 to the trailing edge 26.

The pendulum device 2 is configured to subject a cantilevered wind turbine blade 20, see FIG. 2 and FIG. 3, to transverse edgewise force and comprises a pivot arm 4 having a longitudinal pivot arm axis 31 and being pivotally supported by an arm-supporting structure 6 for pivoting about an essentially horizontal pivot axis 5, a mass member 12 being connected to the pivot arm 4, and a coupling member 29 providing a connection between the pivot arm 4 and a blade fixture 30 configured to be fixedly connected to a desired section of the blade 20. The pivot axis 5, the mass member 12 and the coupling member 29 are mutually spaced along the longitudinal pivot arm axis 31. In the first shown and at present preferred embodiment, the pivot axis 5 of the device 2 is arranged between the mass member 12 and the coupling member 29, and the coupling member 29 is arranged above both the pivot axis 5 and the mass member 12 as seen in the direction of the longitudinal pivot arm axis 31 and as illustrated in FIG. 6a.

The pivot arm 4 is pivotally supported by an arm-supporting structure 6 for pivoting about the essentially horizontal pivot axis 5 at the upper end of the arm supporting structure 6. The arm-supporting structure 6 comprises two mutually spaced upright legs 7, 8 arranged on opposite sides of the pivot arm 4 being pivotal about the pivot axis 5 between the two legs 7, 8. The legs 7, 8 of the arm-supporting structure 6 are at the lower ends connected to a base plate 9 providing stability to the pendulum device. The base plate 9 is configured to be loaded by a ballast 16 comprising a plurality of attachable and detachable ballast weights 10, whereby the stability of the device is improved and can be adapted to the loading of the device 2. The base plate 9 comprises a plurality of base plate modules 11 being mutually attachable and detachable. Thereby it is possible to build a base plate 9 with the desired and needed size. Additionally, it is possible to dismount the base plate and move the base plate and the rest of the device 2 to another position and mount the device at the new place.

The pivot arm 4 is shaped as an essentially rectangular frame member and is at the lower end provided with a mass member 12 comprising a number of weights 13 being attachable and detachable relative to the pivot arm, thereby allowing to provide the desired weight of the mass member 12 and produce the desired force by the device. The weights 13 are provided with positioning pins 14 and positioning holes 15 allowing them to be stably stacked. Instead of having a mass member comprising stackable weights or in addition thereto, the position of the mass member 12 can be adjustable in the longitudinal direction of the pivot arm 4, i.e. the spacing between the pivot axis 5 and the centre of gravity 17 of the mass member can be adjustable. Thereby the desired force produced by the pendulum device 2 can be adjusted and/or additionally adjusted by adjusting the position of mass member 12 along the longitudinal pivot arm axis 31.

The pivot arm 4 extends above the pivot axis 5, and the coupling member 29 providing the connection between the pivot arm 4 and the blade fixture 30 is connected to the pivot arm above the pivot axis 5. The pivot arm axis 5 of the pivot arm 4 is arranged height adjustably in the arm-supporting structure 6, as seen by comparing FIG. 5*a* and FIG. 5*b*, the pivot axis 5 being arranged at a higher level of the legs 7, 8 of the arm-supporting structure 6 in FIG. 5*b* than in FIG. 5*a*.

The above height adjustability of the pivot axis allows for arranging the coupling member 29 of the pivot arm 5 and the blade fixture 30 connected to the coupling member 29 in the correct horizontal plane of the desired blade section for fixedly connecting the blade fixture 30 to the blade and substantially in line with the chord line 28 of the blade section when fatigue testing for edgewise forces is to be carried out by means of the device 2.

The coupling member 29 of the device 2 can be a coupling member compensating for misalignment between the connection point of the coupling member 29 to the pivot arm 4 and the blade fixture, respectively. The misalignment-compensating coupling of the device can be a universal joint or a universal joint like coupling member.

As shown in FIG. 1, the blade fixture 30 comprises a blade fixture frame 32 supporting two parallel plate-shaped fixture members 33, 34. Each fixture member 33, 34 is divided into two fixture parts, an upper part 33*a*, 34*a* and a lower part 33*b*, 34*b* having mutually facing abutment faces configured to define an inner contour 35 of the fixture member 33, 34 corresponding essentially to the outer shape of the wind turbine blade 20 in the section thereof where the blade fixture 30 is to be fixedly connected to the blade.

As illustrated in FIG. 5*c* and in the simplified diagrammatical view of FIG. 6*b*, the coupling member 29 of the device can in a second embodiment be arranged between the mass member 12 and the pivot axis 5, and the mass member 12 can be arranged below both the pivot axis 5 and the coupling member 29, as seen in the direction of the longitudinal pivot arm axis.

According to a third embodiment, the pendulum device can, as diagrammatically illustrated in FIG. 6*c*, be embodied as an inverted pendulum where the coupling member 29 is arranged below the pivot axis 5 and the mass member 12 arranged above the pivot axis 5.

Further, according to a fourth embodiment shown diagrammatically in FIG. 6*c*, the pendulum device can be embodied as an inverted pendulum where the coupling member 29 is arranged between the pivot axis 5 being arranged at the lower end of the pivot arm 4 and the mass member 12 being arranged at the upper end of the pivot arm Reference is made especially to FIG. 2 and FIG. 3 disclosing a system according to the present invention comprising a pendulum device 2 according to the present invention and additionally comprising a blade-supporting structure 18 and an oscillation exciter 19. The blade 20 is a cantilevered blade, the root end 21 of the blade being fixedly supported by the blade-supporting structure 18 and the longitudinal blade axis 27 being essentially horizontal. The blade fixture 30 of the pendulum device 2 is fixedly connected to the blade 18 spaced from the root end 21 of the blade 20, and the exciter is shown arranged on the pressure side 23 of the blade and further spaced from the root end 21 than the blade fixture. The exciter 19 is configured to subject the blade to transverse edgewise movement during the fatigue testing of the blade, and the blade fixture 30 is fixedly connected to the desired blade section essentially in line with the chord line 28. The blade fixture 30 and therefore also the pivot arm 4 of the pendulum device 2 will follow the movement of the wind turbine blade. Although shown mounted on the blade, the exciter could be supported on the ground so as to essentially not load the blade in other directions than edgewise.

LIST OF REFERENCE NUMERALS 1. system
2. pendulum device
4. pivot arm
5. pivot axis
6. arm supporting structure
7. leg
8. leg
9. base plate
10. ballast weights
11. base plate modules
12. mass member
13. weights
14. positioning pins
15. positioning holes
16. ballast
17. centre of gravity
18. blade supporting structure
19. exciter
20. wind turbine blade
21. root end
22. tip end
23. pressure side
24. suction side
25. leading edge
26. trailing edge
27. longitudinal blade axis
28. chord line
29. coupling member
30. blade fixture
31. longitudinal pivot arm axis
32. fixture frame
33. fixture member
33*a*. upper part
33*b* lower part
34. fixture member
34*a*. upper part
34*b*. lower part
35. inner contour
F. force
a. spacing between coupling member and pivot axis
b. spacing between coupling member and centre of gravity

The invention claimed is:

1. A pendulum device for applying an essentially horizontal transverse edgewise force to an essentially horizontal cantilevered wind turbine blade subjected to essentially horizontal edgewise reciprocal movement or vibration during a fatigue test of the wind turbine blade, the wind turbine blade comprising a root end and a tip end and a longitudinal blade axis, the pendulum device comprising:

a rigid pendulum pivot arm having a longitudinal pendulum pivot arm axis and being pivotally supported in an arm-supporting structure for pivoting in an essentially vertical plane about an essentially horizontal pendulum pivot axis, a mass member being connected to the pendulum pivot arm, and a coupling member providing a connection between the pendulum pivot arm and a blade fixture configured to be fixedly connected to the blade, the pendulum pivot axis, the mass member and the coupling member being mutually spaced along the longitudinal pendulum pivot arm axis.

2. A device according to claim 1, wherein the pivot axis of the device is arranged between the mass member and the coupling member, and the coupling member is arranged above both the pivot axis and the mass member, as seen in the direction of the longitudinal pivot arm axis.

3. A device according to claim 1, wherein the coupling member of the device is arranged between the mass member and the pivot axis, and the mass member is arranged below both the pivot axis and the coupling member, as seen in the direction of the longitudinal pivot arm axis.

4. A device according to claim 1, wherein the pivot axis of the device is arranged between the mass member and the coupling member, and the coupling member is arranged below both the pivot axis and the mass member, as seen in the direction of the longitudinal pivot arm axis.

5. A device according to claim 1, wherein the coupling member of the device is arranged between the mass member and the pivot axis, and the mass member is arranged above both the pivot axis and the coupling member, as seen in the direction of the longitudinal pivot arm axis.

6. A device according to claim 1, wherein the mass member comprises a number of weights being attachable and detachable relative to the pivot arm.

7. A device according to claim 1, wherein the mass member is connected adjustably to the pivot arm in the longitudinal direction of the pivot arm.

8. A device according to claim 1, wherein the coupling member and the blade fixture connected thereto is connected adjustably to the pivot arm in the longitudinal direction of the pivot arm.

9. A device according to claim 1, wherein the pivot axis of the pivot arm is arranged height adjustably in the arm-supporting structure.

10. A device according to claim 1, wherein the arm-supporting structure of the device is at the lower end thereof connected to a base plate.

11. A device according to claim 10, wherein the legs of the arm-supporting structure are at the lower ends thereof connected to the base plate.

12. A device according to claim 10, wherein the base plate is configured to be loaded by a ballast.

13. The device according to claim 12, wherein the ballast comprises a number of ballast weights being attachable and detachable relative to the base plate.

14. A device according to claim 1, wherein the arm-supporting structure of the device comprises two mutually spaced upright legs arranged on opposite sides of the pivot arm being pivotal about the pivot axis extending between the two legs.

15. A device according to claim 1, wherein the blade fixture is divided into two fixture parts having respective mutually facing abutment faces configured to define an inner contour corresponding essentially to the outer shape of the blade in a section thereof where the blade fixture is to be fixedly connected to the blade.

16. A system for fatigue test of a wind turbine blade comprising a root end and a tip end and a longitudinal blade axis, and comprising:
   a pendulum device according to claim 1,
   a support structure for fixedly supporting the blade in a cantilevered position at the root end thereof so that the longitudinal blade axis is essentially horizontal and so that an essentially horizontal transverse edgewise force can be applied to the blade by the pendulum device, and
   an oscillation exciter configured for cyclically subjecting the blade to essentially horizontal transverse edgewise reciprocating movement or vibration relative to the support structure.

17. A system according to claim 16 for fatigue testing the blade for transverse edgewise reciprocating movement, wherein the oscillation exciter is configured to subject the blade to transverse edgewise reciprocating movements, and the coupling member providing the connection between the pivot arm and the blade fixture and the blade fixture fixedly connected to the blade are arranged essentially in line with the local chord line of the desired blade section during the fatigue test where to edge wise force are applied to the blade by the pendulum device.

18. Method of fatigue testing of a wind turbine blade for transverse edgewise reciprocating movements or vibrations, comprising the following steps:
   providing a wind turbine blade comprising a root end and a tip end and a longitudinal blade axis,
   fixedly supporting the root end of the blade in a support structure so that the blade is horizontal cantilevered and so that the local chords of the blade are essentially horizontal at the desired blade section where an essentially horizontal transverse edgewise force is to be applied to the blade,
   arranging a pendulum device according to claim 1 relative to the cantilevered blade and fixedly connecting the blade fixture to the blade so that the pivot axis of the pendulum device is essentially parallel to the longitudinal axis of the blade and the coupling member providing the connection between the pivot arm and the blade fixture is essentially in line with the local chord of the desired blade section where the essentially horizontal transverse edgewise force is to be applied to the desired blade section by the pendulum device, and
   providing an oscillation exciter and connect the exciter to the blade so as to subject the blade to a desired region of the blade so as to subject the blade to essentially horizontal transverse edgewise reciprocating movement or vibrations at the desired region of the blade during the fatigue test.

* * * * *